(12) United States Patent
Ge et al.

(10) Patent No.: US 9,013,082 B2
(45) Date of Patent: Apr. 21, 2015

(54) ROTATING MACHINE AND ROTOR THEREOF

(75) Inventors: Xiao Ge, Taoyuan Hsien (TW);
Jian-Ping Ying, Taoyuan Hsien (TW);
Hong-Cheng Sheu, Taoyuan Hsien (TW); Hongliu Zhu, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 758 days.

(21) Appl. No.: 13/237,701

(22) Filed: Sep. 20, 2011

(65) Prior Publication Data
US 2012/0139379 A1    Jun. 7, 2012

(30) Foreign Application Priority Data
Dec. 3, 2010  (CN) .......................... 2010 1 0590746

(51) Int. Cl.
*H02K 1/27*     (2006.01)
*H02K 21/12*    (2006.01)
*H02K 16/04*    (2006.01)
*H02K 21/14*    (2006.01)
*H02K 21/24*    (2006.01)

(52) U.S. Cl.
CPC .................. *H02K 21/12* (2013.01); *H02K 1/27* (2013.01); *H02K 21/14* (2013.01); *H02K 21/24* (2013.01); *H02K 1/2773* (2013.01); *H02K 1/2793* (2013.01); *H02K 16/04* (2013.01)

(58) Field of Classification Search
CPC ... H02K 21/12; H02K 1/2773; H02K 1/2793; H02K 21/14

USPC ................ 310/156.37, 156.36, 112–113, 114
See application file for complete search history.

(56) References Cited

U.S. PATENT DOCUMENTS

| 5,864,197 A | 1/1999 | Naito et al. | |
| 5,952,756 A * | 9/1999 | Hsu et al. | 310/156.35 |
| 2006/0022553 A1* | 2/2006 | Nakayama et al. | 310/268 |
| 2009/0295245 A1* | 12/2009 | Abe et al. | 310/156.35 |

FOREIGN PATENT DOCUMENTS

| CN | 1734895 A | 2/2006 |
| CN | 101199103 A | 6/2008 |
| WO | WO-2009/028266 A1 | 3/2009 |

* cited by examiner

Primary Examiner — Joshua Benitez-Rosario
Assistant Examiner — Leda Pham
(74) Attorney, Agent, or Firm — Muncy, Geissler, Olds & Lowe, P.C.

(57) ABSTRACT

A rotating machine is provided, including a rotor and a stator set. The rotor rotates around an axis, wherein the rotor includes a first permanent magnet set and a second permanent magnet set, the first permanent magnet set is magnetized in a circumference direction of the axis, and the second permanent magnet set is magnetized in an axial direction of the axis. The stator set corresponds to the rotor, wherein the stator set includes a radial stator member and an axial stator member, the axial stator member corresponds to the rotor in the axial direction of the axis, and the radial stator member corresponds to the rotor in a radial direction of the axis.

12 Claims, 8 Drawing Sheets

ROTATING MACHINE AND ROTOR THEREOF

CROSS REFERENCE TO RELATED APPLICATIONS

This Application claims priority of China Patent Application No. 201010590746.4, filed on Dec. 3, 2010, the entirety of which is incorporated by reference herein.

BACKGROUND OF THE INVENTION

1. Field of the Invention

The present invention relates to a rotating machine, and in particular relates to a rotating machine and a rotor having increased unit volume capacity.

2. Description of the Related Art

A conventional rotating machine is composed of a stator and rotor. The stator is arranged corresponding to the rotor, and the rotating machine is rotated by magnetic force generated between the rotor and the stator.

A conventional rotating machine having distributed windings has good torque, inductance and flux weakening performance. However, the conventional rotating machine having distributed windings has grooves crossing across a large amount of silicon steel sheets, and a stator coil is coiled on an end portion of the stator. The length of the end portion of the stator is therefore increased, the length of the coil is increased, an additional radial or axial space occupies the stator, and unit volume capacity is reduced.

Recently, rotating machines having planar structure are popular due to their heat dissipation advantages over other like machines.

BRIEF SUMMARY OF THE INVENTION

In one embodiment, a rotating machine is provided, including a rotor and a stator set. The rotor rotates around an axis, wherein the rotor comprises a first permanent magnet set and a second permanent magnet set, and the first permanent magnet set is magnetized in a circumference direction of the axis, and the second permanent magnet set is magnetized in an axial direction of the axis. The stator set corresponds to the rotor, wherein the stator set comprises a radial stator member and an axial stator member, the axial stator member corresponds to the rotor in the axial direction of the axis, and the radial stator member corresponds to the rotor in a radial direction of the axis.

In another embodiment, a rotor is provided. The rotor is utilized in a rotating machine and rotated along an axis. The rotor includes a rotor core, a first permanent magnet set and a second permanent magnet set. The first permanent magnet set is magnetized in a circumference direction of the rotating machine against the axis. The second permanent magnet set is magnetized in an axial direction of the rotating machine against the axis, wherein the first permanent magnet set is embedded in the rotor core, and the second permanent magnet set is axially disposed on the rotor core.

In another embodiment, a rotor is provided. The rotor is utilized in a rotating machine and rotated along an axis. The rotor includes a rotor core, a first permanent magnet set and a second permanent magnet set. The first permanent magnet set includes a plurality of circumferentially magnetized permanent magnets which are arranged around the axis. The second permanent magnet set includes a plurality of axially magnetized permanent magnets which are arranged around the axis, wherein the circumferentially magnetized permanent magnets and the axially magnetized permanent magnets are arranged staggeredly on a periphery or the rotor, and the axially magnetized permanent magnets are arranged in pairs axially. Each two circumferentially magnetized permanent magnets which are circumferentially adjacent have a same first pole arrangement at corresponding portions thereof. A pair, of the axially facing axially magnetized permanent magnets between the two circumferentially magnetized permanent magnets which are circumferentially adjacent have the same first pole arrangement at corresponding portions thereof.

In another embodiment, a rotating machine is provided, including a rotor and a stator set, an axial air gap, a radial air gap, a first magnetic flow path and a second magnetic flow path. The axial air gap is located between the rotor and an axial stator member of the stator set. The radial air gap is located between the rotor and a radial stator member of the stator set. The first magnetic flow path extends through the rotor, the radial air gap, and the radial stator member. The second magnetic flow path extends through the rotor, the radial air gap, the radial stator member, the axial air gap and the axial stator member.

Via the arrangement of the rotor, the circumferentially magnetized permanent magnets, the axially magnetized permanent magnets, the stator set, the axial stator members and the radial stator member, the space in the axial direction of the end portion of the radial stator coil is sufficiently used, the utilization of the rotor core is increased, and the unit volume capacity is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
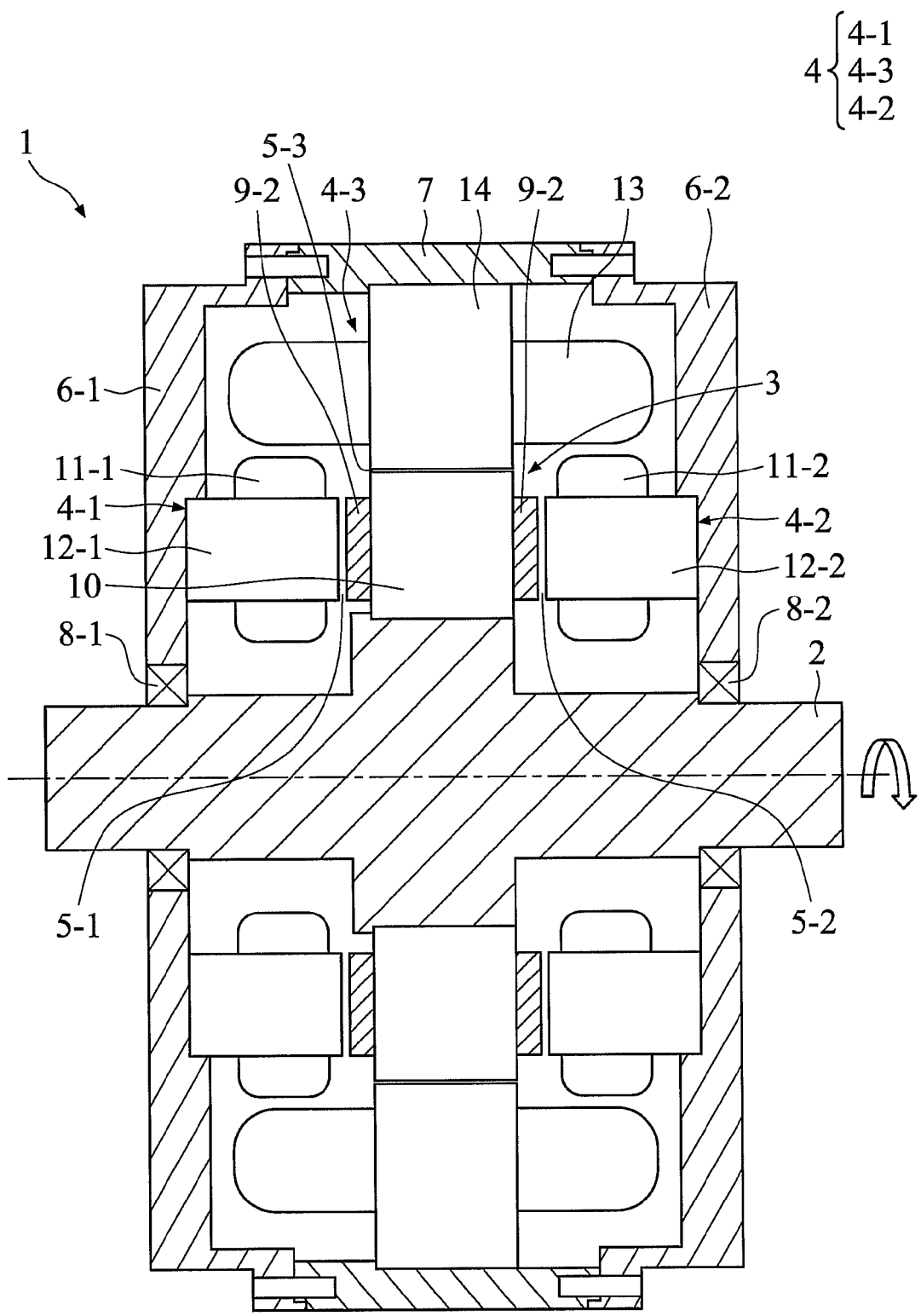
FIG. 1 shows a rotating machine of an embodiment of the invention.
Figure 2A:
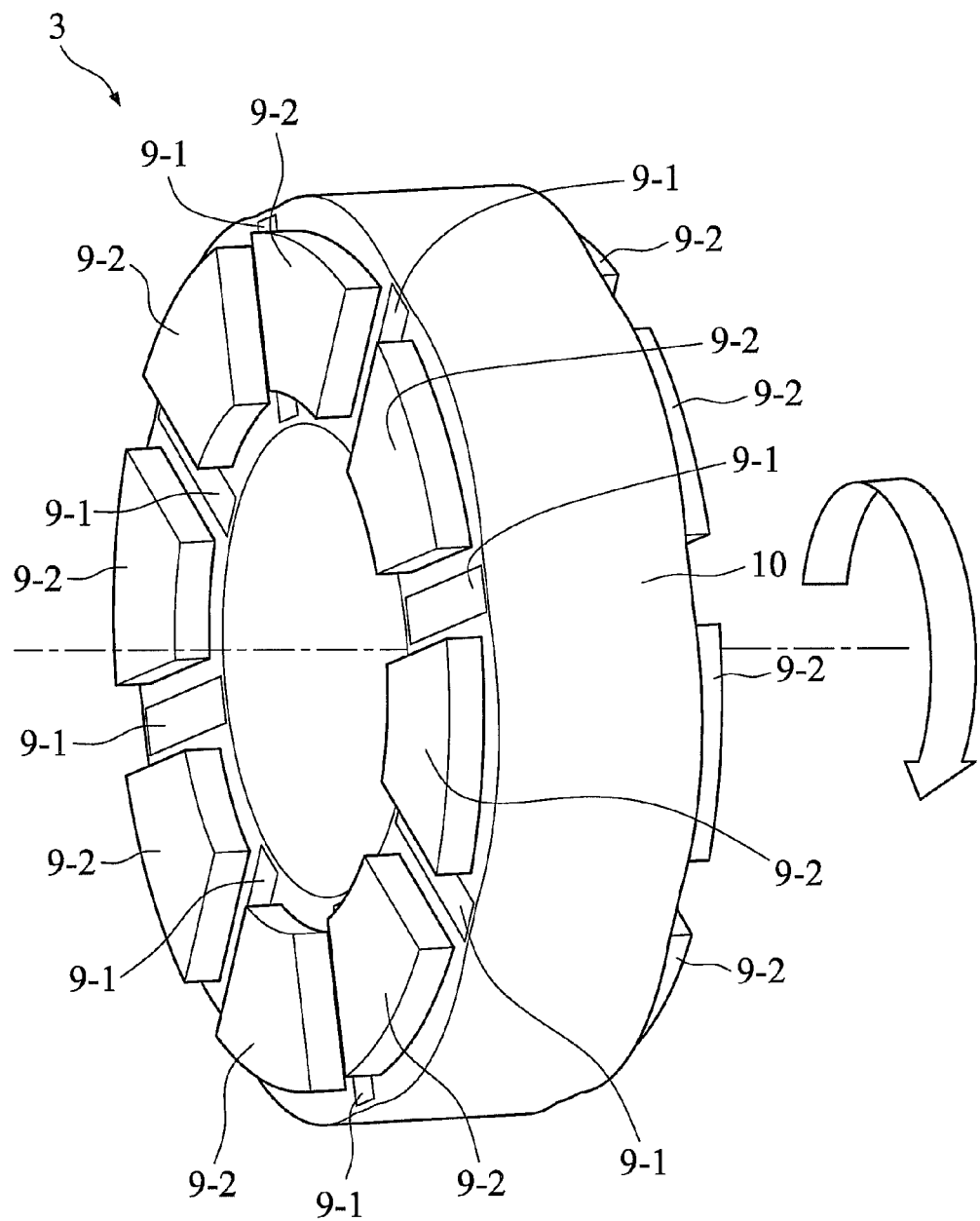
FIG. 2A is a perspective view showing a rotor member and permanent magnet arrangement (including a rotor core)
Figure 2B:
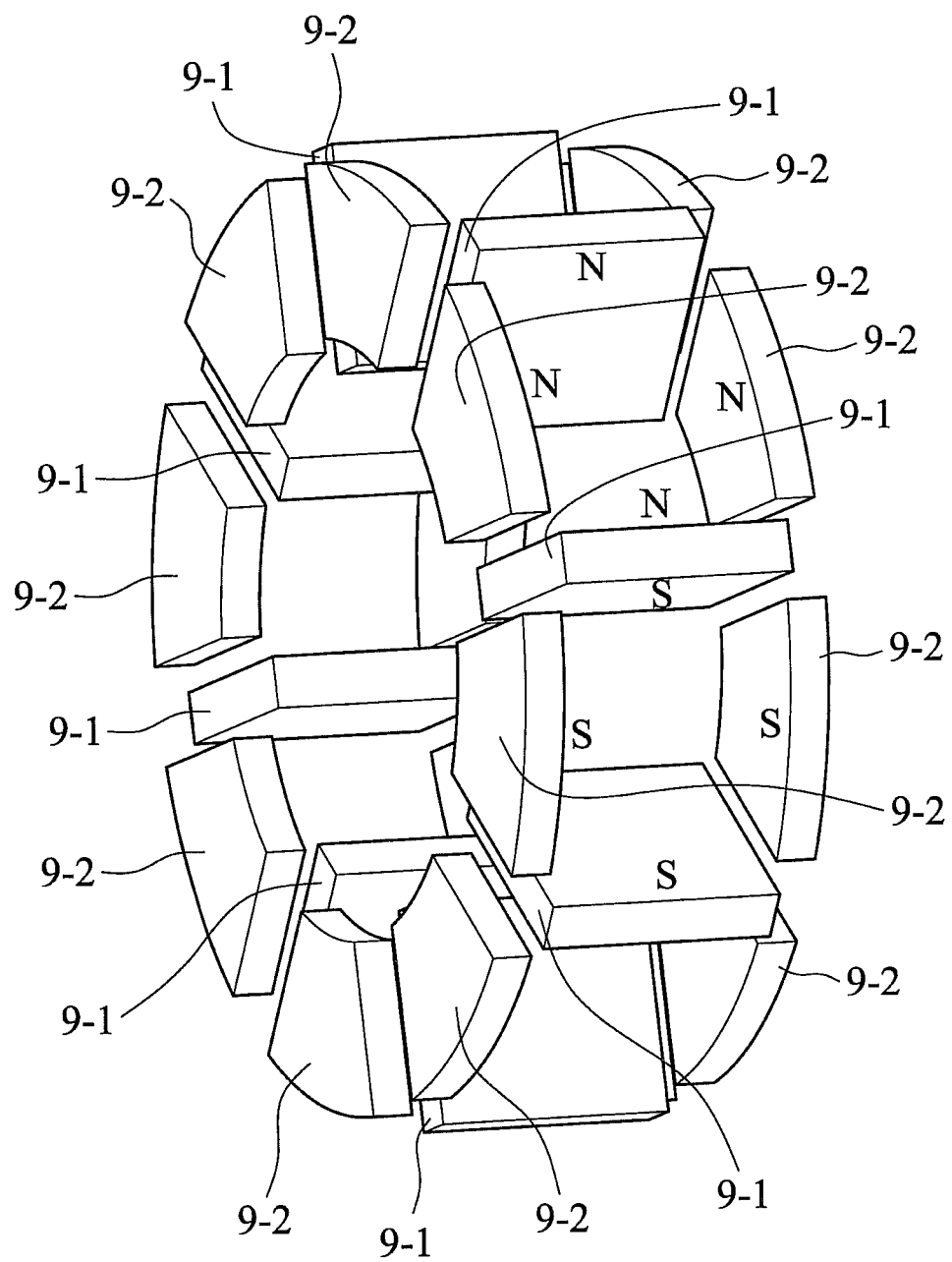
FIG. 2B is a perspective view showing a rotor member and permanent magnet arrangement (not including a rotor core)

With reference to FIGS. 1, 2A and 2B, FIG. 1 shows a rotating machine of an embodiment of the invention, FIG. 2A is a perspective view showing a rotor member and permanent magnet arrangement (including a rotor core), and FIG. 2B is a perspective view showing a rotor member and permanent magnet arrangement (not including a rotor core). The rotating machine 1 comprises a shaft 2, a rotor 3 and a stator set 4. The shaft 2 is disposed along an axis of the rotating machine 1. The rotor 3 is planar, disposed on the shaft 2, and rotates around the shaft 2. The stator set 4 comprises axial stator members (planar stator member) 4-1 and 4-2 and a radial stator member 4-3. The axial stator members 4-1 and 4-2 are disposed along an axial direction and face the rotor 3. The radial stator member 4-3 is disposed along an radial direction and faces the rotor 3. Following, the axial direction is an extended direction of the axis of the rotating machine 1, and the radial direction is a diametric direction of the rotor 3. The axial direction and the radial direction are not restricted to the directions which are overlapping the axis or the diameter of the rotor 3, but are directional tendencies. A deviation in direction due to tolerance during assembly is expected. Axial air gaps 5-1 and 5-2 are respectively formed between the rotor 3 and the axial stator members 4-1 and 4-2. A radial air gap 5-3 is formed between the radial stator member 4-3 and the rotor 3. The axial stator members 4-1 and 4-2 are disposed in the covers 6-1 and 6-2. The axial stator members 4-1 and 4-2 can be fixed to the covers 6-1 and 6-2 via through holes, screws or epoxy resins. The radial stator member 4-3 is fixed in the housing 7. The radial stator member 4-3 can be disposed in the housing 7 via wedging. The covers 6-1 and 6-2 are mechanically connected to the housing 7. The shaft 2 is rotatably connected to the covers 6-1 and 6-2 via the bearings 8-1 and 8-2. The axial stator members 4-1 and 4-2 are respectively composed by the axial stator coils 11-1 and 11-2, and the axial stator cores 12-1 and 12-2. The radial stator member 4-3 is composed by the radial stator coil 13 and radial stator core 14. The axial stator coils 11-1 and 11-2 and the radial stator coil 13 are respectively coiled on the axial stator cores 12-1 and 12-2 and the radial stator core 14.

As shown in FIGS. 2A and 2B, the rotor 3 comprises a rotor core 10, axially magnetized permanent magnets 9-2 and circumferentially magnetized permanent magnets 9-1. The axially magnetized permanent magnets 9-2 are axially disposed on two sides of the rotor core 10 and circumferentially arranged. The pole direction of the axially magnetized permanent magnets 9-2 is axial; that is, axially magnetized. In this embodiment, the axially magnetized permanent magnets 9-2 are axially attached on two sides of the rotor core 10. The circumferentially magnetized permanent magnets 9-1 are disposed in the rotor core 10, and are circumferentially arranged. The pole direction of the circumferentially magnetized permanent magnets 9-1 is circumferential; that is, circumferentially magnetized. The circumferentially magnetized permanent magnets 9-1 and the axially magnetized permanent magnets 9-2 are staggeredly arranged. The axially magnetized permanent magnets 9-2 are arranged in pairs which face to each other. In this invention, the circumferential direction extends along the periphery of the rotor 3 which is rotated against the shaft 2. The circumferential direction is not restricted to the directions which overlap the periphery of the rotor 3, but is a directional tendency. For example, in this embodiment, the magnetizing directions of the circumferentially magnetized permanent magnets 9-1 do not overlap with the periphery of the rotor 3, but are close to the periphery of the rotor 3. Therefore, the magnetizing directions of the circumferentially magnetized permanent magnets 9-1 are defined as being circumferentially magnetized. The circumferentially magnetized permanent magnets 9-1 and the axially magnetized permanent magnets 9-2 are arranged with spaces. Two circumferentially adjacent circumferentially magnetized permanent magnets 9-1 and two axially adjacent axially magnetized permanent magnets 9-2 form a chamber (an open chamber with a rectangular opening). The rotor core 10 is partially in the chamber. FIG. 2B shows poles of the circumferentially magnetized permanent magnets 9-1 and the axially magnetized permanent magnets 9-2. Each two circumferentially magnetized permanent magnets which are circumferentially adjacent have a same pole arrangement (same N poles or same S poles) at corresponding portions thereof, and each two circumferentially magnetized permanent magnets which are circumferentially adjacent have a pair of the axially facing axially magnetized permanent magnets between the two circumferentially magnetized permanent magnets which are circumferentially adjacent having the same pole arrangement (same N poles or same S poles) at corresponding portions thereof. In a preferred embodiment, the circumferentially magnetized permanent magnets 9-1 and the axially magnetized permanent magnets 9-2 are equidistantly arranged on a circumferential direction.

Figure 3A:
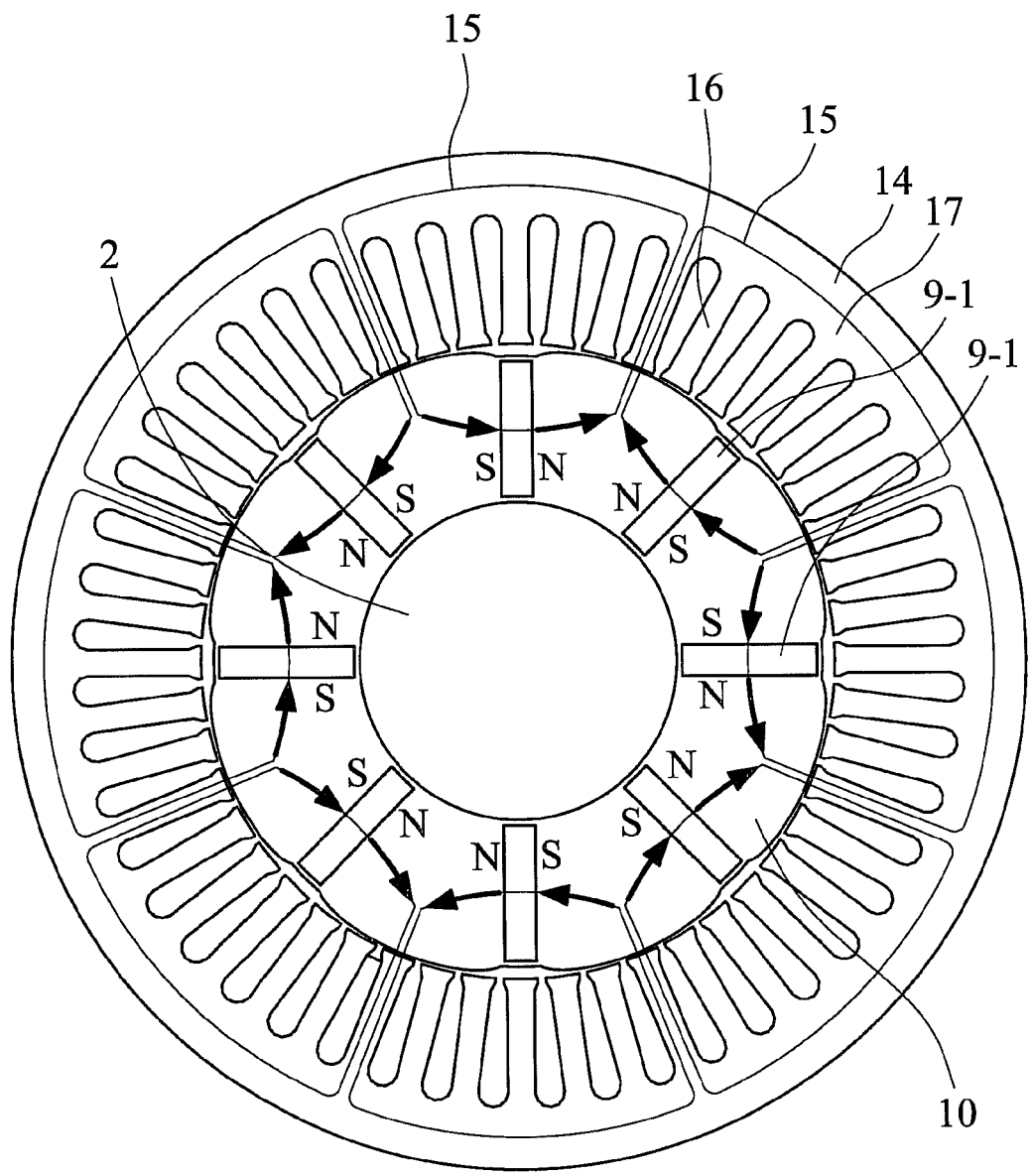
FIG. 3A shows magnetic flow paths of the circumferentially magnetized permanent magnets 9-1 of the rotating machine.
Figure 3B:
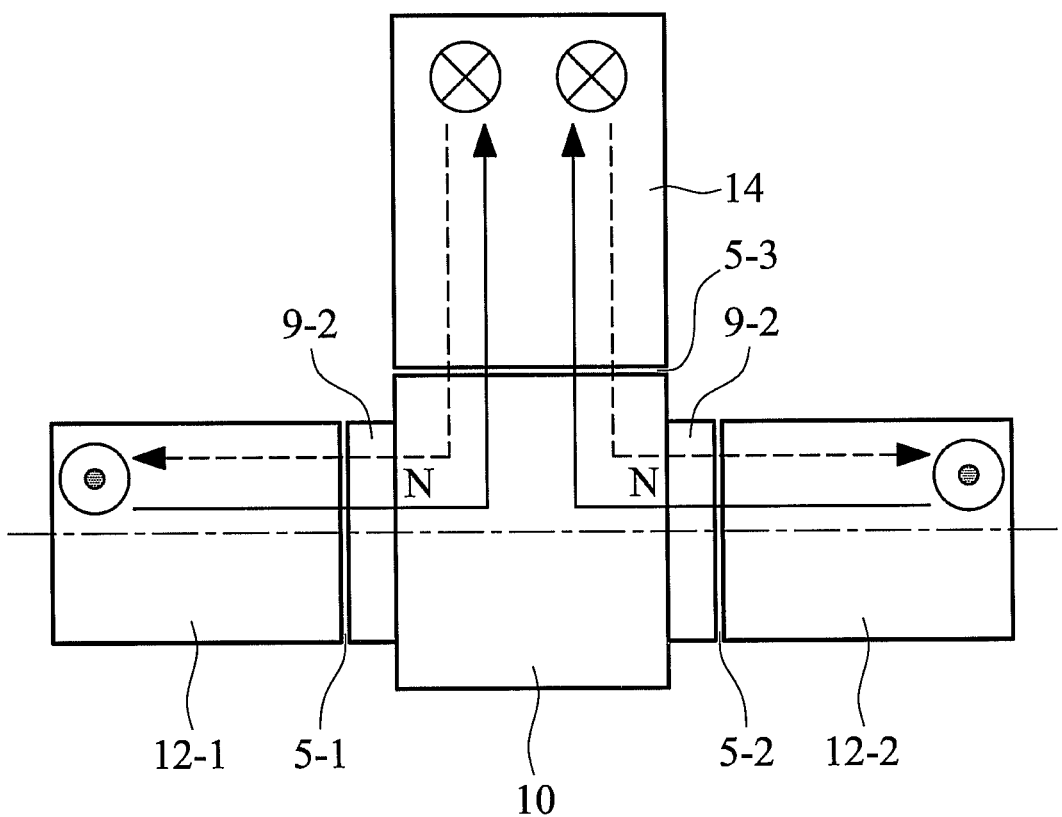
FIG. 3B shows magnetic flow paths of the axially magnetized permanent magnets 9-2 of the rotating machine.

FIGS. 3A and 3B shows magnetic flow paths of the circumferentially magnetized permanent magnets 9-1 and the axially magnetized permanent magnets 9-2 of the rotating machine. With reference to FIGS. 1, 2B, 3A and 3B, in FIG. 3A, a first magnetic flow path (magnetic flow path of the circumferentially magnetized permanent magnet 9-1) travels from an N pole of the circumferentially magnetized permanent magnet, to pass through the rotor core 10 received in the chamber. Following, the first magnetic flow path flows to the radial air gap 5-3, to the tooth 16, and then to the yoke 17 of the radial stator core 14, and then travels from the tooth 16 of the radial stator core 14 adjacent S pole, to pass through the radial air gap 5-3 and the rotor core 10 received in the chamber to the S pole of the circumferentially magnetized permanent magnet 9-1. The arrangement of circumferentially magnetized permanent magnet 9-1 in the rotor core 10 increases the saliency ratio (Lq/Ld) of quadrature-axis inductance and d-axis inductance, increases reluctance torque, and improves unit volume capacity. As shown in FIG. 3B, a second magnetic flow path (magnetic flow path of the axially magnetized permanent magnets 9-2) travels from an N pole of one of the axially magnetized permanent magnets 9-2, to pass through the rotor core 10 received in the chamber, and the radial air gap 5-3 to the tooth 16 and the yoke 17 of the radial stator core 14 corresponding to the axially magnetized permanent magnets 9-2 (real line in FIG. 3B). Following, the second magnetic flow path then travels from the tooth 16 of the radial stator core 14 corresponding to the circumferentially adjacent axially magnetized permanent magnets 9-2 (another axially magnetized permanent magnets 9-2), to pass through the radial air gap 5-3, the rotor core 10 received in the chamber corresponding to the adjacent axially magnetized permanent magnet 9-2, the adjacent axially magnetized permanent magnet 9-2 (S pole to N pole), and the axial air gaps 5-1 and 5-2, to the teeth and the yokes (not shown) of the axial stator cores 12-1 and 12-2 facing the adjacent axially magnetized permanent magnet 9-2 (dotted line in FIG. 3B), and then travels from the teeth of the axial stator cores 12-1 and 12-2, through the axial air gaps 5-1 and 5-2 to an S pole of the axially magnetized permanent magnet 9-2 where the second magnetic flow path starts from (real line in FIG. 3B). For the radial air gap magnetic flow path, each pole surface is parallel connected by the circumferentially magnetized permanent magnet 9-1 and the axially magnetized permanent magnet 9-2, providing magnetic effect of focusing on the rotating machine, increasing the magnetic current density of the radial air gap, and increasing the power of the rotating machine.

Figure 3C:
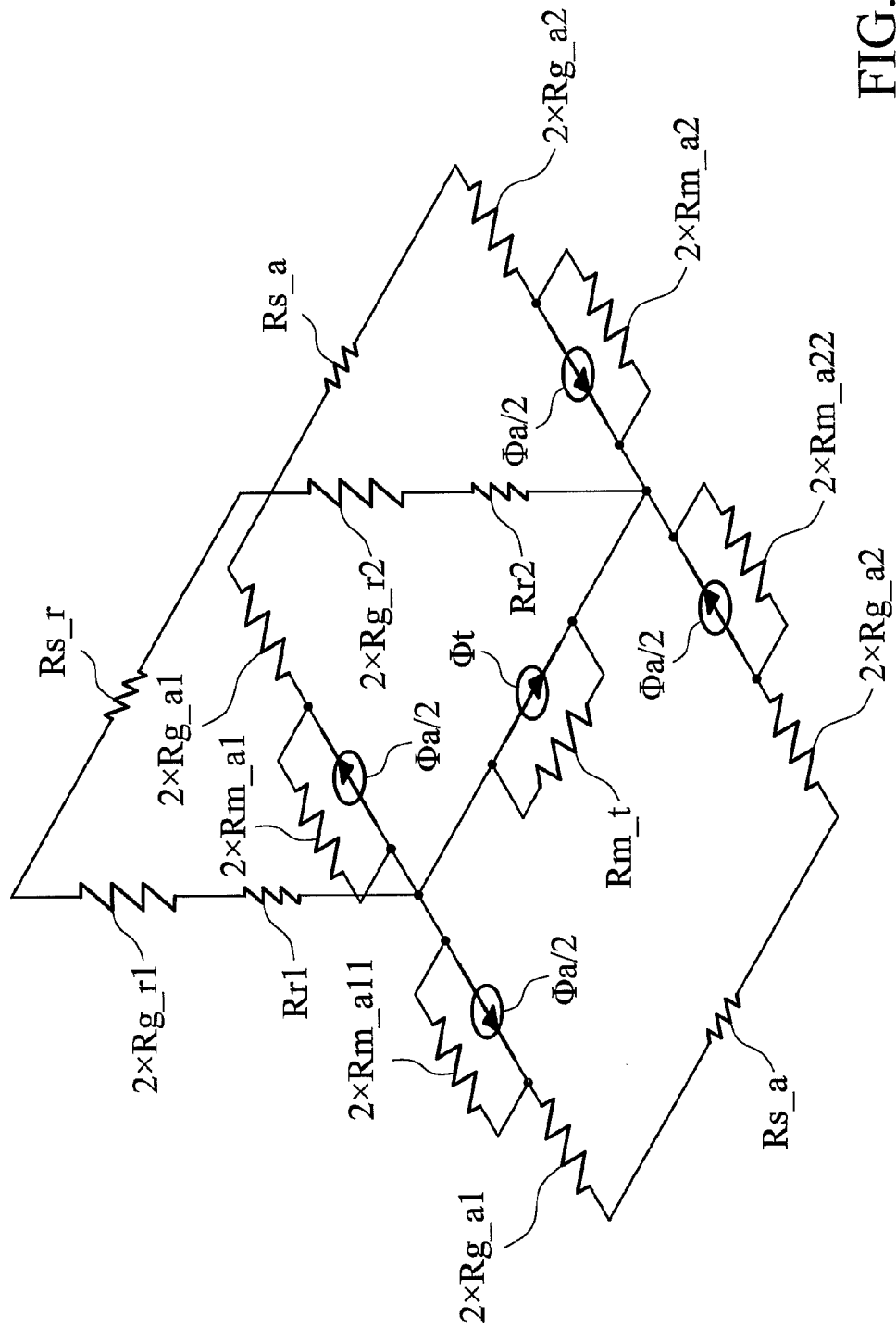
FIG. 3C shows an equivalent magnetic circuit of the rotating machine of the embodiment of the invention.

FIG. 3C shows an equivalent magnetic circuit of the rotating machine of the embodiment of the invention. In the embodiment of the invention, the two circumferentially adjacent axially magnetized permanent magnets 9-2 are defined respectively by having magnetic flux Φa and reluctances Rm_a1 and Rm_a2. However, the equivalent magnetic circuit in FIG. 3C is equivalent to half of the two circumferentially adjacent axially magnetized permanent magnets 9-2. Therefore, in FIG. 3C, the axially magnetized permanent magnets 9-2 equivalently have magnetic flux Φa/2 and reluctances 2×Rm_a1 and 2×Rm_a2. A part of the reluctances mentioned are equivalent to two times that of the original reluctances. Similarly, the two axially magnetized permanent magnets 9-2 which axially corresponding to the two circumferentially adjacent axially magnetized permanent magnets 9-2 respectively have magnetic flux Φa/2 and reluctances 2×Rm_a11 and 2×Rm_a22. The magnetic flux Φa/2 of one of the magnetized permanent magnets 9-2 (with reluctance 2×Rm_a1) travels from an N pole thereof, to pass through axial air gaps 5-1 and 5-2 (with reluctance 2×Rg_a1), axial stator cores 12-1 (with reluctance Rs_a), and axial air gaps 5-1 and 5-2 (with reluctance 2×Rg_a2), to the circumferentially adjacent axially magnetized permanent magnet 9-2 (with reluctance 2×Rm_a2), and then travels from the rotor core 10 (with reluctance Rr2) received in the chamber corresponding to the adjacent axially magnetized permanent magnet 9-2, to pass through the air gap (with reluctance 2×Rg_r1), the radial stator core 14 (with reluctance Rs_r), the air gap (with reluctance 2×Rg_r1), the rotor core 10 (with reluctance Rr1) received in the chamber corresponding to the axially magnetized permanent magnet 9-2, and to the S pole of the axially magnetized permanent magnet 9-2 where the second magnetic flow path starts from. The magnetic flow path of the two axially magnetized permanent magnets 9-2 on a side of the rotor core 10 is the same as the magnetic flow path of the two axially magnetized permanent magnets 9-2 on the other side of the rotor core 10. The N pole of one of the axially magnetized permanent magnets 9-2 corresponds to the axial air gap, and the N pole of the other axially magnetized permanent magnet 9-2 adjacent thereto corresponds to the rotor core. The magnetic flow path is a close-loop path, which can also be described as starting from the axially magnetized permanent magnet 9-2 corresponding to the rotor core (with reference to FIG. 3B). The circumferentially magnetized permanent magnets 9-1 between the circumferentially adjacent axially magnetized permanent magnets 9-2 have magnetic flux Φt and reluctance Rm_t. The magnetic flux Φt travels from the N pole of the circumferentially magnetized permanent magnet 9-1, and passes through the rotor core 10 (with reluctance Rr2) received in the chamber corresponding to the N pole of the circumferentially magnetized permanent magnet 9-1, the radial air gap (with reluctance 2×Rg_r2), and the radial stator core 14 (with reluctance Rs_r), and then passes through the radial air gap (with reluctance 2×Rg_r1), and the rotor core 10 (with reluctance Rr1) received in the chamber corresponding to the S pole of the circumferentially magnetized permanent magnet 9-1, and the flows back to the S pole of the circumferentially magnetized permanent magnet 9-1.

As mentioned above, via the arrangement of the rotor 3, the circumferentially magnetized permanent magnets 9-1, the axially magnetized permanent magnets 9-2, the stator set 4, the axial stator members 4-1 and 4-2 and the radial stator member 4-3, the space in the axial direction of the end portion of the radial stator coil 13 is sufficiently used, the utilization of the rotor core 10 is increased, and unit volume capacity is improved. The rotor core 10 does not face the axial air gap, thus preventing core loss caused by armature reactions. Additionally, when rotating, the axially magnetized permanent magnets 9-2 generate air flow which removes heat from the rotating machine.

In FIGS. 1, 2A, 2B, 3A, 3B and 3C, the radial stator member 4-3 corresponds to the outer periphery of the rotor 3. However, the invention is not limited thereby.

Figure 4:
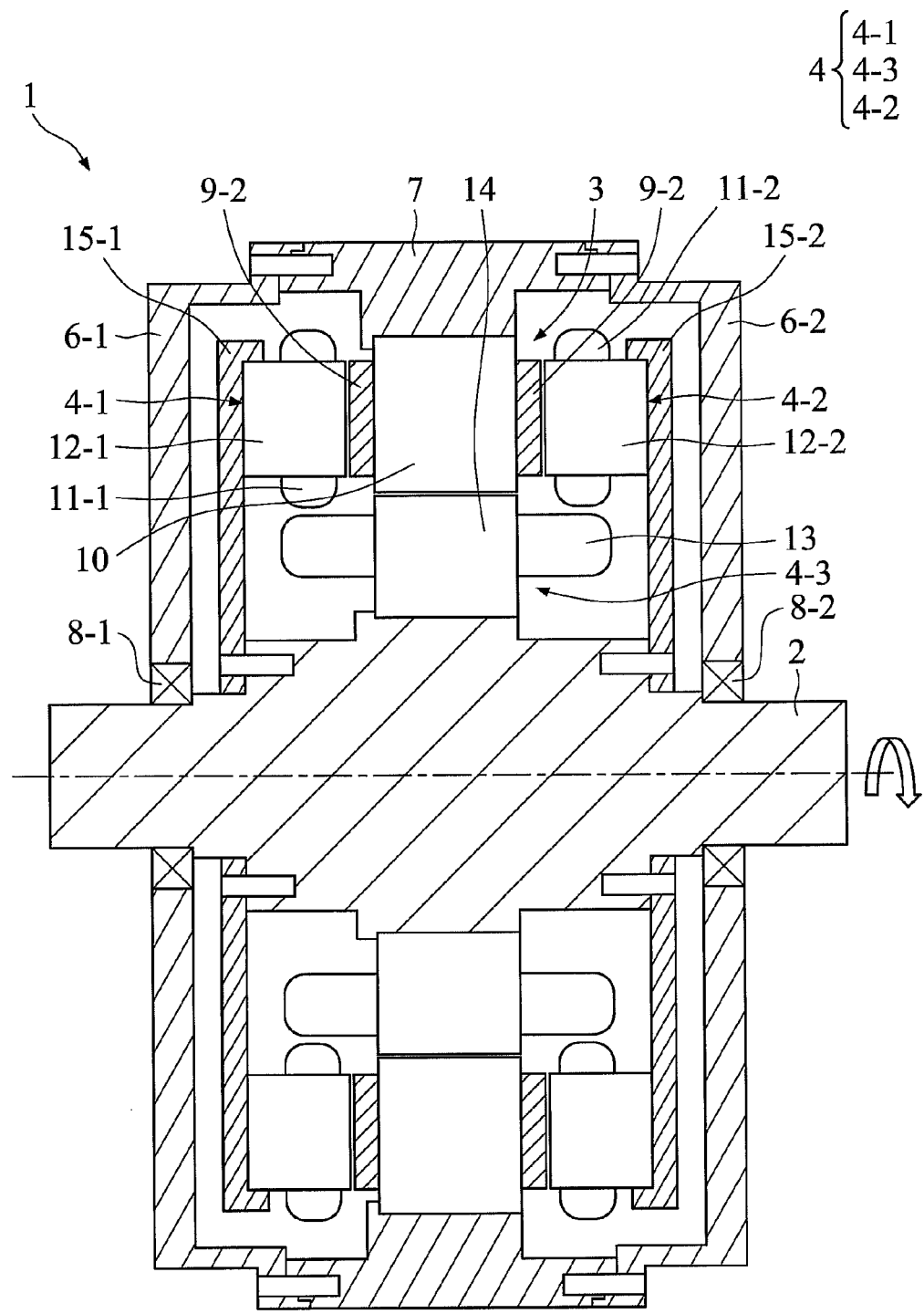
FIG. 4 shows a rotating machine of another embodiment of the invention.

FIG. 4 shows a rotating machine of another embodiment of the invention. Compared to the embodiment of FIG. 1, in the embodiment of FIG. 4, the rotor 3 is fixed on the housing 7, and the radial stator member 4-3 corresponds to the inner periphery of the rotor 3 and is fixed on the shaft 2. The axial stator members 4-1 and 4-2 are axially and symmetrically disposed on the rotor 3, and are fixed on braces 15-1 and 15-2. When the rotating machine operates, the axial stator members 4-1 and 4-2 and the radial stator member 4-3 are static, and the housing 7 and covers 6-1 and 6-2 of the rotor 3 are rotated around the axis. In a modified embodiment, the axial stator members can corresponds to outer and inner peripheries of the rotor 3 simultaneously.

Figure 5:
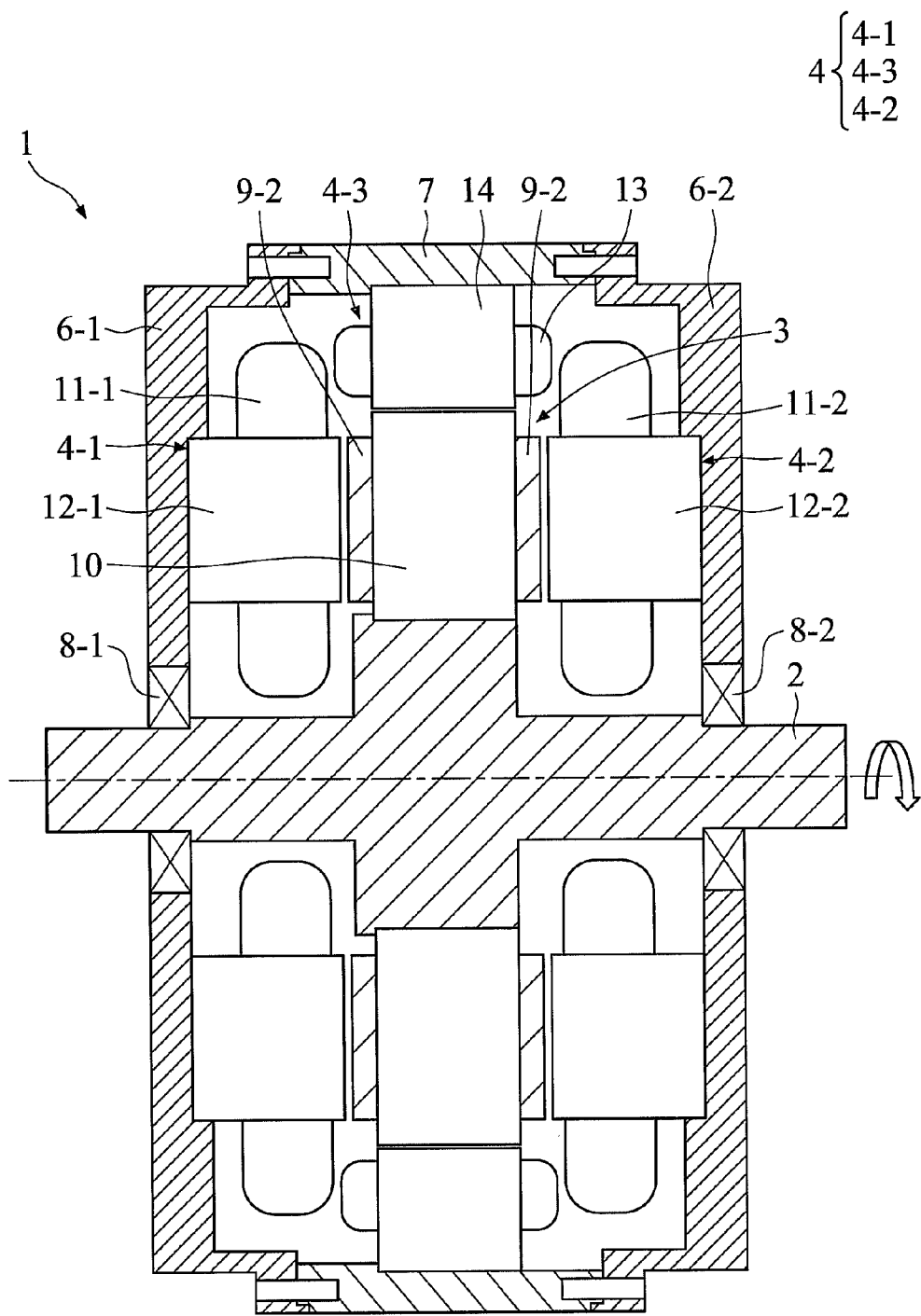
FIG. 5 shows a rotating machine of another embodiment of the invention.

FIG. 5 shows a rotating machine of another embodiment of the invention. In the embodiments of FIGS. 1, 2A, 2B, 3A, 3B, 3C and 4, the end portions of the radial stator coil 13 are longer in length to sufficiently utilize axial space. However, the invention is not limited thereby. In the embodiment of FIG. 5, the end portions of the axial stator coils 11-1 and 11-2 have a longer length to sufficiently utilize radial space.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating machine, comprising:
    a rotor, rotating around an axis, wherein the rotor comprises a first permanent magnet set and a second permanent magnet set, and the first permanent magnet set is magnetized in a circumference direction of the axis, and the second permanent magnet set is magnetized in an axial direction of the axis, wherein the first permanent magnet set comprises a plurality of circumferentially magnetized permanent magnets, the second permanent magnet set comprises a plurality of axially magnetized permanent magnets, and each axially magnetized permanent magnet is located between two adjacent circumferentially magnetized permanent magnets in a circumferential direction; and
    a stator set, corresponding to the rotor, wherein the stator set comprises a radial stator member and an axial stator member, the axial stator member corresponds to the rotor in the axial direction of the axis, and the radial stator member corresponds to the rotor in a radial direction of the axis,
    wherein the circumferentially magnetized permanent magnets and the axially magnetized permanent magnets are arranged staggeredly on a periphery of the rotor, and the axially magnetized permanent magnets are arranged in pairs axially, wherein each two circumferentially magnetized permanent magnets which are circumferentially adjacent have a same first pole arrangement at corresponding portions thereof, and a pair of the axially facing axially magnetized permanent magnets between the two circumferentially magnetized permanent magnets which are circumferentially adjacent have a same first pole arrangement at corresponding portions thereof.

2. The rotating machine as claimed in claim 1, wherein, the radial stator member corresponds to the rotor, a radial air gap is formed between the radial stator member and the rotor, the axial stator member corresponds to the rotor, and an axial air gap is formed between the axial stator member and the rotor.

3. The rotating machine as claimed in claim 1, wherein the radial stator member corresponds to a radial outer periphery or a radial inner periphery of the rotor.

4. A rotor, utilized for a rotating machine and rotated along an axis, comprising:
a rotor core;
a first permanent magnet set, magnetized in a circumference direction of the rotating machine against the axis; and
a second permanent magnet set, magnetized in an axial direction of the rotating machine against the axis, wherein the first permanent magnet set is embedded in the rotor core, and the second permanent magnet set is axially disposed on the rotor core, wherein the first permanent magnet set comprises a plurality of circumferentially magnetized permanent magnets, and the second permanent magnet set comprises a plurality of axially magnetized permanent magnets, and each axially magnetized permanent magnet is located between two adjacent circumferentially magnetized permanent magnets in a circumferential direction,
wherein the circumferentially magnetized permanent magnets and the axially magnetized permanent magnets are arranged staggeredly on a periphery of the rotor, and the axially magnetized permanent magnets are arranged in pairs axially, wherein each two circumferentially magnetized permanent magnets which are circumferentially adjacent have a same first pole arrangement at corresponding portions thereof, and a pair of the axially facing axially magnetized permanent magnets between the two circumferentially magnetized permanent magnets which are circumferentially adjacent have a same first pole arrangement at corresponding portions thereof.

5. The rotor as claimed in claim 4, wherein the rotor core comprises a first side surface and a second side surface, and the axially magnetized permanent magnets are attached on the first side surface and the second side surface.

6. The rotor as claimed in claim 4, wherein the circumferentially magnetized permanent magnets and the axially magnetized permanent magnets are uniformly arranged on the periphery of the rotor.

7. A rotor, utilized for a rotating machine and rotated along an axis, comprising:
a rotor core;
a first permanent magnet set, comprising a plurality of circumferentially magnetized permanent magnets which are arranged around the axis ; and
a second permanent magnet set, comprising a plurality of axially magnetized permanent magnets which are arranged around the axis, wherein the circumferentially magnetized permanent magnets and the axially magnetized permanent magnets are arranged staggeredly on a periphery of the rotor, and the axially magnetized permanent magnets are arranged in pairs axially, wherein each two circumferentially magnetized permanent magnets which are circumferentially adjacent have a same first pole arrangement at corresponding portions thereof, and a pair of the axially facing axially magnetized permanent magnets between the two circumferentially magnetized permanent magnets which are circumferentially adjacent have the same first pole arrangement at corresponding portions thereof, wherein each axially magnetized permanent magnet is located between two adjacent circumferentially magnetized permanent magnets in a circumferential direction.

8. The rotor as claimed in claim 7, wherein the rotor core comprises a first side surface and a second side surface, and the axially magnetized permanent magnets are attached on the first side surface and the second side surface.

9. The rotor as claimed in claim 7, wherein the circumferentially magnetized permanent magnets and the axially magnetized permanent magnets are uniformly arranged on the periphery of the rotor.

10. A rotating machine, comprising:
a rotor and a stator set;
an axial air gap, located between the rotor and an axial stator member of the stator set;
a radial air gap, located between the rotor and a radial stator member of the stator set;
a first magnetic flow path, extending through the rotor, the radial air gap, and the radial stator member; and
a second magnetic flow path, extending through the rotor, the radial air gap, the radial stator member, the axial air gap and the axial stator member,
wherein the rotor comprises a first permanent magnet set and a second permanent magnet set, the first permanent magnet set comprises a plurality of circumferentially magnetized permanent magnets, and the second permanent magnet set comprises a plurality of axially magnetized permanent magnets, wherein each axially magnetized permanent magnet is located between two adjacent circumferentially magnetized permanent magnets in a circumferential direction,
wherein the circumferentially magnetized permanent magnets and the axially magnetized permanent magnets are arranged staggeredly on a periphery of the rotor, and the axially magnetized permanent magnets are arranged in pairs axially, wherein each two circumferentially magnetized permanent magnets which are circumferentially adjacent have a same first pole arrangement at corresponding portions thereof, and a pair of the axially facing axially magnetized permanent magnets between the two circumferentially magnetized permanent magnets which are circumferentially adjacent have a same first pole arrangement at corresponding portions thereof.

11. The rotating machine as claimed in claim 10, wherein the radial stator member comprises a radial stator core, and the rotor comprises a rotor core, wherein the first magnetic flow path travels from an N pole of the circumferentially magnetized permanent magnet, to pass through the rotor core, and the radial air gap to the radial stator core, and then travels from the radial stator core, to pass through the radial air gap and the rotor core to an S pole of the circumferentially magnetized permanent magnet.

12. The rotating machine as claimed in claim 10, wherein the axial stator member comprises an axial stator core, the rotor comprises a rotor core, wherein the second magnetic flow path travels from an N pole of one of the axially magnetized permanent magnets, to pass through the rotor core, and the radial air gap to the radial stator core, and then travels from the radial stator core, to pass through the radial air gap, the rotor core, the other adjacent axially magnetized permanent magnet, and the axial air gap to the axial stator core, and then travels through the axial stator core and the axial air gap to an S pole of the axially magnetized permanent magnet where the second magnetic flow path starts from.

* * * * *